US012803801B2

(12) United States Patent
Garrido et al.

(10) Patent No.: US 12,803,801 B2
(45) Date of Patent: Nov. 17, 2026

(54) METHOD OF DECRYPTING AN ENCRYPTED SECRET AND ASSOCIATED DEVICES

(71) Applicant: THALES, Meudon (FR)

(72) Inventors: Eric Garrido, Genevilliers (FR); Simon Abelard, Genevilliers (FR); Valentin Vasseur, Genevilliers (FR)

(73) Assignee: THALES, Meudon (FR)

( * ) Notice: Subject to any disclaimer, the term of this patent is extended or adjusted under 35 U.S.C. 154(b) by 47 days.

(21) Appl. No.: 18/956,647

(22) Filed: Nov. 22, 2024

(65) Prior Publication Data

US 2025/0175334 A1 May 29, 2025

(51) Int. Cl.
*H04L 9/08* (2006.01)
*H04L 9/30* (2006.01)

(52) U.S. Cl.
CPC .......... *H04L 9/3026* (2013.01); *H04L 9/0825* (2013.01); *H04L 9/304* (2013.01)

(58) Field of Classification Search
CPC ...... H04L 9/3026; H04L 9/0825; H04L 9/304
USPC .......... 380/30
See application file for complete search history.

(56) References Cited

U.S. PATENT DOCUMENTS 8,327,242 B1 * 12/2012 Anholt .................. H03M 13/45 714/785
8,875,001 B1 * 10/2014 Mazahreh ......... H03M 13/2909 714/783
2008/0148129 A1 * 6/2008 Moon .................. H03M 13/15 714/781
2010/0220859 A1 * 9/2010 Lu .......................... H04L 9/302 380/255
2012/0159179 A1 * 6/2012 Lauter .................. H04L 9/3247 380/44

OTHER PUBLICATIONS

Chen, Cong, et al., "Masking Large Keys in Hardware: A Masked Implementation of McEliece", Aug. 12, 2015 (Aug. 12, 2015), SAT 2015 18th International Conference, Austin, TX, USA, Sep. 24-27, 2015; [Lecture Notes in Computer Science; Lect.Notes Computer], Springer, Berlin, Heidelberg, pp. 293-309.
Aragon, Nicolas, et al., "BIKE: Bit Flipping Key Encapsulation. Round 4 Submission", Oct. 10, 2022 (Oct. 10, 2022), pp. 1-51.
Bettale, Luk, et al., "Security Assessment of NTRU Against Non-Profiled SCA", Jan. 29, 2023 (Jan. 29, 2023), Jan. 29, 2023, pp. 248-268.
FR 2312929, INPI Rapport de Recherche Preliminaire, Aug. 13, 2024, 1 page.

* cited by examiner

*Primary Examiner* — Thanh T Le
(74) *Attorney, Agent, or Firm* — Soquel Group LLC

(57) ABSTRACT

A method for decrypting a secret encrypted by a QC-MDPC mechanism, the decryption method being implemented by a receiver and including reception of a syndrome polynomial derived from the secret, generation of random integers, application of respective operations on the first and second sparse polynomials of the private key, application of a third operation on the syndrome polynomial, search for modified error polynomials such as the linear combination of modified error polynomials gives the modified syndrome polynomial, and deduction of the shared secret by application of a respective operation on the first and second modified error polynomials, the five operations depending on the generated random integers and keeping the weight of the polynomial on which the operation is applied.

14 Claims, 2 Drawing Sheets

METHOD OF DECRYPTING AN ENCRYPTED SECRET AND ASSOCIATED DEVICES

REFERENCE TO RELATED APPLICATION

This application is a U.S. non-provisional application claiming the benefit of French Application No. 23 12929 filed on Nov. 23, 2023, the contents of which are incorporated herein by reference in their entirety.

TECHNICAL FIELD OF THE INVENTION

The present invention relates to a method for decrypting a secret encrypted by an asymmetric cryptographic key encapsulation mechanism based on Quasi-Cyclic Moderate-Density Parity-Check corrector code. The invention further relates to an encryption device, associated receiver and communication system.

BACKGROUND OF THE INVENTION

Within the framework of the preparation for the advent of quantum computers, many so-called "post-quantum" cryptographic mechanisms have been developed.

A post-quantum cryptographic mechanism is an algorithm constructed as being more robust from an algorithmic point of view for the use in a quantum computer compared to a so-called classical algorithm.

It is in particular the case with the bit flipping key encapsulation mechanism.

Such a mechanism is more often referred to as the BIKE algorithm.

The abbreviation BIKE refers to the corresponding English name of "Bit Flipping Key Encapsulation".

However, an attacker may also have access to physical quantities of the physical system implementing such a cryptographic algorithm. The computation time, the amount of heat radiation, the amount of electromagnetic radiation and consumption are examples of such physical quantities.

Through such access, the attacker can recover secret information exchanged by using the cryptographic mechanism even if the algorithm is not broken in the algorithmic sense of the term.

Such an attack is called auxiliary channel attack or SCA attack, the abbreviation SCA then referring to the corresponding English name of "Side Channel Attack".

It is thus desirable to make the post-quantum algorithms insensitive to attacks by side channels.

To this end, it is possible to apply an approach consisting in decomposing the computation performed by the post-quantum algorithm into elementary operations. The elementary operations herein are additions, multiplications, logical operations "AND", "OR" and "XOR".

Then, the elementary operations are protected by masking techniques. Masked multiplication, masked sum, and masked comparison are examples of masking techniques.

To ensure good security, such an approach is implemented for each elementary operation, which makes the approach tedious and with a high impact on the performance of implementation of the algorithm. Typically, the implementation time is 15 to 30 times longer with the use of such an approach.

There is thus a need for a method of decrypting a secret encrypted by a post-quantum cryptographic algorithm that is robust to attacks by side channels and has a better implementation time.

SUMMARY OF THE INVENTION

To this end, the description describes a method of decrypting a secret encrypted by an asymmetric cryptographic key encapsulation mechanism based on a Quasi-Cyclic Moderate-Density Parity-Check corrector code, the cryptographic mechanism using a private key formed by two sparse polynomials, the decryption method being implemented by the receiver and comprising:

- the reception of a syndrome polynomial derived from the secret,
- the generation of random integers,
- the application of a first operation on the first sparse polynomial of the private key, to obtain a first modified sparse polynomial,
- the application of a second operation on the second sparse polynomial forming the private key, to obtain a second modified sparse polynomial forming with the first modified sparse polynomial, a modified private key,
- the application of a third operation on the syndrome polynomial to obtain a modified syndrome polynomial to decrypt,
- the search for modified error polynomials such as the linear combination of modified error polynomials by the modified private key gives the modified syndrome polynomial to decrypt, and
- the deduction of the shared secret by applying a fourth operation on the first modified error polynomial and a fifth operation on the second modified error polynomial,
- the five operations depending on the generated random integers and keeping the weight of the polynomial on which the operation is applied, the weight of a polynomial being the number of non-zero coefficients of the polynomial.

According to particular embodiments, the decryption method has one or a plurality of the following features, taken individually or according to all technically possible combinations:

- the syndrome polynomial is generated from the two sparse polynomials, a first error polynomial, and a second error polynomial, and the five operations compensate each other so that the first error polynomial results from the application of the fourth operation on the first modified error polynomial, and the second error polynomial results from the application of the fifth operation on the second modified error polynomial.
- each of the five operations is the same function parameterized by at least one integer, at least one integer parameterizing the function depending on at least one random integer generated.
- at least one integer parameterizing the function is specific to each operation.
- at least two integers parameterizing the function are linear combinations of two random integers generated.
- each of the operations associated with a polynomial P(X), the modified polynomial $P(X)*X^T$ modulo $X^{T+1}-1$, the polynomial and the modified polynomial having a degree less than or equal to d, r and d being integers.
- each operation associates to a polynomial P(X) made of monomials $a_kX^k$, k being less than or equal to the degree of the polynomial P(X), the modified polynomial P'(X) made of the monomials $a_kX^{(k*a)\ modulo\ r)}$, T and r being nonzero integers.
- the cryptographic mechanism is a bit flipping key encapsulation algorithm.

during the generation step, only three integers are generated

The description further describes a device for decrypting a secret encrypted by an asymmetric cryptographic key encapsulation mechanism based on a Quasi-Cyclic Moderate-Density Parity-Check corrector code, the cryptographic mechanism using a private key formed by two sparse polynomials, a receiver being suitable for receiving a syndrome polynomial derived from the secret, the decryption device being suitable for:

generating random integers, applying a first operation on the first sparse polynomial of the private key, to obtain a first modified sparse polynomial, applying a second operation on the second sparse polynomial forming the private key, to obtain a second modified sparse polynomial forming with the first modified sparse polynomial, a modified private key, applying a third operation on the syndrome polynomial to obtain a modified syndrome polynomial to decrypt, searching for modified error polynomials such as the linear combination of modified error polynomials by the modified private key gives the modified syndrome polynomial to decrypt, and deducing the shared secret by applying a fourth operation on the first modified error polynomial and a fifth operation on the second modified error polynomial, the five operations depending on the generated random integers and keeping the weight of the polynomial on which the operation is applied, the weight of a polynomial being the number of non-zero coefficients of the polynomial.

The description also proposes a receiver suitable for receiving a syndrome polynomial derived from a secret encrypted by an asymmetric cryptographic key encapsulation mechanism based on a Quasi-Cyclic Moderate-Density Parity-Check corrector code, the cryptographic mechanism using a private key formed by two sparse polynomials, the receiver comprising a decryption device.

The description further proposes a communication system including:

a transmitter adapted to encrypt a secret by an asymmetric cryptographic key encapsulation mechanism based on a Quasi-Cyclic Moderate-Density Parity-Check corrector code, the cryptographic mechanism using a private key formed by two sparse polynomials, the transmitter being adapted to send a syndrome polynomial derived from the secret, and a receiver as described hereinabove.

In the present description, the expression "suitable for" means equally well "adapted to" or "configured for".

BRIEF DESCRIPTION OF THE DRAWINGS

The features and advantages of the invention will appear upon reading the following description, given only as an example, but not limited to, and making reference to the enclosed drawings, wherein.

DETAILED DESCRIPTION OF EMBODIMENTS

Figure 1:
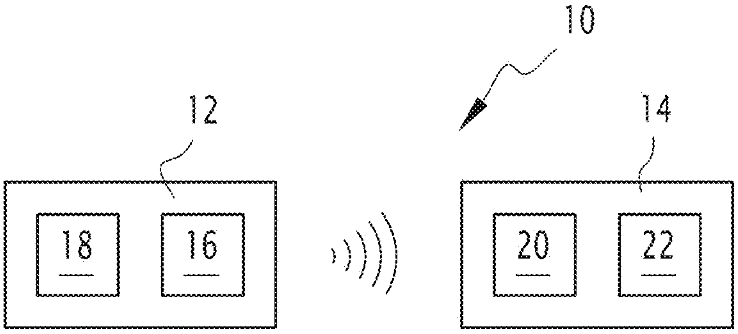
FIG. 1 is a schematic representation of a communication system.

The communication system 10 is shown schematically in FIG. 1.

The communication system 10 includes a transmitter 12 and a receiver 14.

The communication system 10 aims to provide communication between the transmitter 12 and the receiver 14, e.g., satellite communication.

The transmitter 12 includes a transmission antenna 16 and an encryption device 18.

The transmission antenna 16 is suitable for transmitting information to other antennas.

The encryption device 18 is suitable for encrypting messages by implementing a cryptographic mechanism.

The cryptographic mechanism is an asymmetric cryptographic algorithm for key encapsulation.

Such a cryptographic mechanism is often referred to as KEM, the abbreviation referring to the corresponding English name of "Key Encapsulation Mechanism".

In the present example, the cryptographic mechanism is a post-quantum algorithm, i.e., is constructed as being more robust for the use in a quantum computer compared to a so-called classical algorithm.

More precisely, the cryptographic mechanism is an algorithm based on Quasi-Cyclic Moderate-Density Parity-Check corrector code.

Such a corrector code is more often referred to as QC-MDPC corrector code. The abbreviation QC-MDPC refers to the corresponding English name "Quasi-Cyclic Moderate Density Parity Check".

According to the example described, the cryptographic mechanism is a key encapsulation algorithm using a bit flipping decoding algorithm (BIKE algorithm as indicated hereinabove).

The encryption device 18 uses a private key formed by two sparse polynomials denoted by h1 and h2.

Each of the sparse polynomials h1 and h2 is a polynomial on GF (2).

GF (2) refers to a Galois field of order 2, i.e. a finite field comprising two elements. The notation $\mathbb{F}_2$ is sometimes used to denote such field.

The polynomials h1 and h2 are sparse polynomials modulo $X^T-1$.

A sparse polynomial is a polynomial the majority of coefficients of which are zero. As an order of magnitude, for a polynomial on the order of 10,000 coefficients, only a hundred coefficients would be equal to 1.

T is an integer greater than 10,000, so that the polynomials forming the private and public keys are larger than 10,000 bits.

Preferably, the integer T is chosen to correspond to a security level AES.

The abbreviation AES herein refers to the corresponding English name of "Advanced Encryption Standard".

As a specific example, an integer T equal to 12,323 bits will be chosen for a security level AES 128, an integer T equal to 24,659 bits for a security level AES 192 and an integer T equal to 40,973 bits for a security level AES 256.

Each sparse polynomial h1 and h2 is thereby a polynomial with coefficients on {0.1} and having a low weight.

The weight of a polynomial is the number of non-zero coefficients of the polynomial. A weight is considered low when the weight is greater than or equal to 100 and less than or equal to 300.

The private key is known to the receiver 14.

The receiver 14 includes a receiver antenna 20 and a decryption device 22.

The receiver antenna 20 is adapted to receive information coming from other antennas, and in particular from the transmitter antenna 16.

The decryption device 22 is an information processing unit consisting, e.g., of a memory and of a processor associated with the memory.

The memory of the decryption device 22 is then adapted to store a decryption software.

In a variant (not shown), the decryption device 22 is produced in the form a programmable logic component, such as an FPGA (Field Programmable Gate Array), or else of an integrated circuit, such as an ASIC (Application Specific Integrated Circuit).

When the decryption device 22 is produced in the form of one or a plurality of software programs, i.e., in the form of a computer program, also called a computer program product, same is further adapted of being recorded on a computer-readable medium (not shown). The computer-readable medium is, e.g., a medium adapted to store the electronic instructions and to be coupled to a bus of a computer system. As an example, the readable medium is an optical disk, a magneto-optical disk, a ROM, a RAM, any type of non-volatile memory (e.g. FLASH or NVRAM) or a magnetic card. A computer program containing software instructions is then stored on the readable medium.

The same remarks apply to the encryption device 18.

Figure 2:
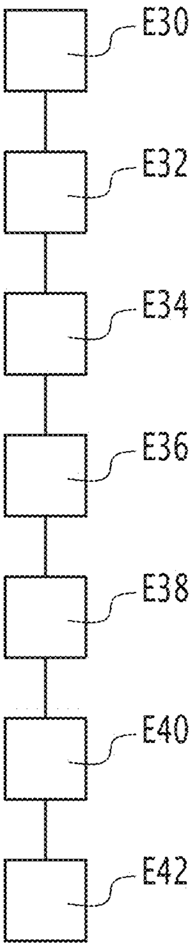
FIG. 2 is a flowchart of an example of implementation of a method for decrypting a secret encrypted by an asymmetric cryptographic key encapsulation mechanism based on a Quasi-Cyclic Moderate-Density Parity-Check corrector code.

The operation of the device 22 will now be described, with reference to FIG. 2 as a flowchart illustrating an example of implementation of a method for decrypting a secret.

It is assumed that a private key is known to the receiver 14, so that the two sparse polynomials h1 and h2 are known to the decryption device 22.

It is assumed that the encryption device 18 has access to a public key, deriving from the two sparse polynomials h1 and h2.

Moreover, the transmitter 12 wishes to exchange a secret with the receiver 14.

According to the specification of the KEM BIKE, the encapsulation process consists in randomly generating an error pattern described by a first error polynomial e1 and a second error polynomial e2, from which a secret session key and a cipher sent to the receiver 14 are deduced. Such operation described in the BIKE specification involves hash functions.

The two error polynomials e1 and e2 are polynomials on GF (2) modulo $X^T-1$.

From the error the polynomials e1 and e2 and the sparse polynomials h1 and h2, the transmitter 12 computes a syndrome polynomial S according to the following mathematical formula:

$$S = e1 * h1 + e2 * h2$$

The decryption method comprises a reception step E30, a generation step E32, a first application step E34, a second application step E36, a third application step E38, a search step E40, and a deduction step E42.

During the reception step E30, the receiver 14 receives the syndrome polynomial S derived from the secret.

During the generation step E32, the decryption device 22 generates random integers.

According to the example described, the decryption device 22 draws three random integers r1, r2 and r3 in the interval [0, . . . , T−1]. The draw herein is equiprobable.

During the first application step E34, the decryption device 22 applies a first operation O1 to the first sparse polynomial h1.

The result of the first operation O1 is a first modified sparse polynomial h1'. The above is expressed mathematically as:

$$h1' = O1(h1)$$

In the example described, the first operation O1 is a "cyclic rotation" operation. Such an operation is expressed as:

$$P >>> r = P(X) * X^r [\text{modulo } X^T - 1]$$

where:

P denotes a polynomial,

>>> illustrates the operation of cyclic rotation, r denotes an integer parameterizing the operation, X the variable on which the polynomial depends, and

* denotes multiplication.

In the case of the first operation O1, the integer parameterizing the operation is (r3−r1) modulo T, so that the first operation O1 writes with the preceding notations:

$$O1(h1) = h1 >>> ((r3 - r1) \text{modulo } T)$$

During the second application step E36, the decryption device 22 applies a second operation O2 to the second sparse polynomial h2.

The result of the second operation O2 is a second modified sparse polynomial h2'. The above is expressed mathematically as:

$$h2' = O2(h2)$$

The second O2 operation is also an operation of "cyclic rotation", the integer parameterizing the operation being different since it is (r3+r2) modulo T. The second O2 operation is expressed as follows with the previous notations:

$$O2(h2) = h2 >>> ((r3 + r2) \text{modulo } T)$$

The combination of the first modified sparse polynomial h1' and the second modified sparse polynomial h2' forms a modified private key.

During the third application step E38, the decryption device 22 applies a third operation O3 to the syndrome polynomial S.

The result of the third O3 operation is a modified syndrome polynomial S'. The above is expressed mathematically as:

$$S' = O3(S)$$

The third operation O3 is also an operation of "cyclic rotation", the integer parameterizing the operation being different since it is r3. The third operation O3 is expressed as follows with the previous notations:

$$O3(S) = S >>> r3$$

The modified syndrome polynomial obtained at the end of the third application step E38 is the polynomial to be decrypted.

To this end, during the search step E40, the decryption device 22 searches for a first modified error polynomial e1' and a second modified polynomial e2' verifying a condition dependent on the modified syndrome polynomial S'.

According to the example described, the condition is that the linear combination of the modified error polynomials e1' and e2' by the modified private key gives the modified syndrome polynomial S'. Thereof corresponds to the following equation:

$$e1' * h1 + e2' * h2 = S'$$

By solving said equation, the decryption device 22 obtains the first modified error polynomial e1' and the second modified polynomial e2'.

During the deduction step E42, the decryption device 22 deduces the shared secret.

To this end, the decryption device 22 applies a fourth operation O4 to the first modified error polynomial e1'.

The fourth operation O4 is parametrized to compensate the results of the preceding operations.

The result of the fourth operation O4 is the first error polynomial e1, which is expressed mathematically as:

$$e1 = O4(e1')$$

The fourth operation O4 is also an operation of "cyclic rotation", the integer parameterizing the operation being different since it is r1. The fourth operation O4 is expressed as follows with the previous notations:

$$O4(e1') = e1' >>> r1$$

The decryption device 22 also applies a fifth operation O5 to the second modified error polynomial e2'.

The fifth operation O5 is parametrized to compensate the results of the preceding operations.

The result of the fifth operation O5 is the second error polynomial e2, which is expressed mathematically as:

$$e2 = O5(e2')$$

The fifth operation O5 is also an operation of "cyclic rotation", the integer parameterizing the operation being different since it is r2. The fifth operation O5 is expressed as follows with the previous notations:

$$O5(e2') = e2' >>> r2$$

The decryption device 22 thus recovers the initial error pattern, giving same access to the secret shared between the transmitter 12 and the receiver 14.

The method implemented by the decryption device 22 randomly changes the representation of the long vectors at the input and output of the decoding algorithm by modifying five operations.

The decryption method thereby forms a countermeasure to side channel attacks implemented on a post-quantum key exchange algorithm (herein a BIKE algorithm).

The method also serves to keep the same decoding mechanism as in the original BIKE algorithm.

As a result, the described method preserves performance and interoperability with other implementations of the BIKE algorithm.

Moreover, the method does not involve modifying the physical implementation of the BIKE algorithm, the additional computational load being low.

The method can be implemented for any security level of the BIKE algorithm.

The method provides the best compromise between a good implementation performance and a good level of security.

In the present case, the right level of security corresponds to good resistance to side channel attacks.

Other embodiments are conceivable.

More particularly, the method may use different operations.

More specifically, each operation depends on at least one generated random integer and keeps the weight of the polynomial on which the operation is applied.

Preferably, as is the case herein, each of the five operations is the same function parameterized by at least one randomly generated integer. Cyclic rotation is just one particular example of a function that can be used herein.

Furthermore, at least one integer parameterizing the function is specific to each operation.

To improve security, at least two integers parameterizing the function are linear combinations of two generated random integers.

Moreover, it is possible to implement the above steps in a different order or simultaneously, depending on the most favorable implementation in the particular case.

Another example of implementation of a method for decrypting a secret will now be described.

In this other example, the five operations applied are different from what has been described previously.

A rotation operation named $g_d$ which, to a polynomial P(X) associates a modified polynomial P'(X), is defined. The operation $g_d$ associates to each monomial $X^K$, k being less than or equal to the degree of the polynomial P(X), the monomial $x^{((k*a)\ modulo\ r)}$, with a, a non-zero integer and d an integer parametrizing the function.

During the generation step E32, the decrypting device 22 generates a random nonzero integer a, the integer a being chosen in the range [1, . . . , T−1].

The operation O1 applied at step E34 is expressed mathematically as:

$$O1(h1) = g_a(h1)$$

In this example of implementation, operations O1, O2 and O3 are parametrized the same way, that is:

$$O2(h2) = g_a(h2)$$

and:

$$O3(S) = g_a(S)$$

The first operation O1 applied at step E34, the second operation O2 applied at step E36, and the third operation O3 applied at step E38 thus associate to each monomial $X^K$ from the first sparse polynomial h1, the second sparse polynomial h2, and the syndrome polynomial S respectively the monomial $x^{((k*a)\ modulo\ r)}$.

The fourth operation O4 applied by the decrypting device 22 on the first modified error polynomial e1' is mathematically expressed as:

$$O4(e1') = g_{a^{-1}}(e1')$$

$a^{-1}$ being the modular inverse of a according to the multiplication modulo T, which satisfies the relation:

$$a^{-1} * a = 1\ [\text{modulo } T]$$

The fifth operation O5 applied by the decrypting device 22 on the second modified error polynomial e2' is mathematically expressed as:

$$O5(e2') = g_{a^{-1}}(e2')$$

The fourth operation O4 and the fifth operation O5 applied by the decrypting device 22 on the first modified error polynomial e1' and the second modified error polynomial e2' respectively thus associate to each monomial $X^K$, from the first modified error polynomial e1' and the second modified error polynomial e2', the monomial $$X^{\left(\left(k*\frac{1}{a}\ modulo\ r\right)\right)}.$$

Moreover, it is possible to implement the above steps in a different order or simultaneously, depending on the most favorable implementation in the particular case.

The invention claimed is:

1. A decryption method of a secret encrypted by an asymmetric cryptographic key encapsulation mechanism using a private key formed by first and second sparse polynomials, the decryption method being implemented by a receiver comprising an antenna, a memory and a processor associated with the memory, the method comprising:

receiving a syndrome polynomial derived from the secret;

generating random integers;

applying a first operation on the first sparse polynomial of the private key, to obtain a first modified sparse polynomial;

applying a second operation on the second sparse polynomial forming the private key, to obtain a second modified sparse polynomial forming with the first modified sparse polynomial a modified private key;

applying a third operation on the syndrome polynomial to obtain a modified syndrome polynomial to be decrypted;

searching for modified error polynomials, comprising first and second modified error polynomials; and deducing a shared secret by applying a fourth operation on the first modified error polynomial and a fifth operation on the second modified error polynomial, the five operations depending on the generated random integers and keeping a weight of each respective polynomial on which the operation is applied, the weight of a polynomial being the number of non-zero coefficients of the polynomial.

2. The decryption method of claim 1, wherein the syndrome polynomial is generated from the first and second sparse polynomials, a first error polynomial, and a second error polynomial, and wherein the five operations compensate each other so that the first error polynomial is retrieved by applying the fourth operation on the first modified error polynomial, and the second error polynomial is retrieved by applying the fifth operation on the second modified error polynomial.

3. The decryption method of claim 1, wherein each of the five operations is a same function parameterized by at least one integer, the at least one integer depending on at least one of the generated random integers.

4. The decryption method according to claim 3, wherein the at least one integer parameterizing the function is specific to each operation.

5. The decryption method according to claim 3, wherein at least two integers parameterizing the function are linear combinations of two of the generated random integers.

6. The decryption method according to claim 1, wherein each of the operations associates with a polynomial P(X), the modified polynomial $P(X)*X^r$ modulo $X^{T+1}-1$, the polynomial and the modified polynomial having a degree less than or equal to T, r and T being integers.

7. The decryption method according to claim 1, wherein each of the operations associates with a polynomial P(X) made of the monomials $X^k$, k being less than or equal to the degree of the polynomial P(X), the modified polynomial P'(X) made of the monomials $x^{((k*a)\ modulo\ r)}$, a and r being nonzero integers.

8. The decryption method according to claim 1, wherein the asymmetric cryptographic key encapsulation mechanism is a bit flipping key encapsulation algorithm.

9. The decryption method according to claim 1, wherein, during said generating, only three random integers are generated.

10. The decryption method of claim 1 wherein searching for modified error polynomials comprises searching for a linear combination of modified error polynomials by the modified private key gives that generates the modified syndrome polynomial.

11. A decryption device for decrypting a secret encrypted by an asymmetric cryptographic key encapsulation mechanism using a private key formed by first and second sparse polynomials and having been shared between a transmitter and a receiver of which the decryption device is part, the receiver suitable for receiving a syndrome polynomial derived from the secret, the decryption device comprising a memory and a processor associated with the memory, and being suitable for:

generating random integers, applying a first operation on the first sparse polynomial of the private key, to obtain a first modified sparse polynomial, applying a second operation on the second sparse polynomial forming the private key, to obtain a second modified sparse polynomial forming with the first modified sparse polynomial, a modified private key, applying a third operation on the syndrome polynomial to obtain a modified syndrome polynomial to decrypt, searching for modified error polynomials comprising first and second modified error polynomials that generate the modified syndrome polynomial, and deducing a shared secret by applying a fourth operation to the first modified error polynomial and a fifth operation to the second modified error polynomial, the five operations depending on the generated random integers and keeping the weight of the polynomial on which the operation is applied, the weight of a polynomial being the number of non-zero coefficients of the polynomial.

12. A receiver adapted to receive a syndrome polynomial derived from a secret encrypted by an asymmetric cryptographic key encapsulation mechanism using a private key formed by first and second sparse polynomials and having been shared between a transmitter and the receiver, the receiver comprising the decryption device according to claim 11.

13. A communication system comprising:

a transmitter adapted to encrypt a secret by an asymmetric cryptographic mechanism for encapsulating a key using a private key formed by first and second sparse polynomials, the transmitter being adapted to send a syndrome polynomial derived from the secret; and the receiver according to claim 12.

14. The method of claim 11 wherein said searching comprises searching for a linear combination of modified error polynomials by the modified private key that generates the modified syndrome polynomial.

* * * * *